United States Patent
Ye (10) Patent No.: US 10,924,223 B2
(45) Date of Patent: Feb. 16, 2021

(54) METHOD OF MANAGING HARQ BUFFER FOR NR

(71) Applicant: Google LLC, Mountain View, CA (US)

(72) Inventor: Shiang-Rung Ye, Sanchong (TW)

(73) Assignee: Google LLC, Mountain View, CA (US)

( * ) Notice: Subject to any disclaimer, the term of this patent is extended or adjusted under 35 U.S.C. 154(b) by 89 days.

(21) Appl. No.: 16/261,006

(22) Filed: Jan. 29, 2019

(65) Prior Publication Data

US 2019/0253201 A1    Aug. 15, 2019

Related U.S. Application Data

(60) Provisional application No. 62/630,817, filed on Feb. 14, 2018.

(51) Int. Cl.

| H04L 1/18 | (2006.01) |
| H04W 72/14 | (2009.01) |
| H04W 76/11 | (2018.01) |
| H04W 28/02 | (2009.01) |
| H04W 72/04 | (2009.01) |
| H04W 80/02 | (2009.01) |

(52) U.S. Cl.
CPC .......... *H04L 1/1835* (2013.01); *H04L 1/1812* (2013.01); *H04L 1/1822* (2013.01); *H04L 1/1874* (2013.01); *H04L 1/1887* (2013.01); *H04W 28/0278* (2013.01); *H04W 72/042* (2013.01); *H04W 72/14* (2013.01); *H04W 76/11* (2018.02); *H04W 80/02* (2013.01)

(58) Field of Classification Search
None
See application file for complete search history.

(56) References Cited

U.S. PATENT DOCUMENTS

| 2010/0027460 A1* | 2/2010 | Kim ...................... H04L 1/1874 370/315 |
| 2010/0182973 A1* | 7/2010 | Kim ..................... H04W 72/082 370/329 |
| 2013/0182653 A1* | 7/2013 | Earnshaw ............. H04L 1/1822 370/329 |
| 2015/0172023 A1* | 6/2015 | Yang ..................... H04L 1/1854 370/329 |

(Continued)

FOREIGN PATENT DOCUMENTS

| WO | 2017052170 | 3/2017 |
| WO | 2017052182 | 5/2017 |
| WO | 2019160817 | 8/2019 |

OTHER PUBLICATIONS

"International Search Report and Written Opinion", PCT Application No. PCT/US2019/017506, dated May 20, 2019, 15 pages.

(Continued)

*Primary Examiner* — Duc T Duong
(74) *Attorney, Agent, or Firm* — Colby Nipper (57) ABSTRACT

This document describes techniques for, and systems that enable, HARQ buffer management. These techniques include removing (314), based on a user device failing to transmit data during an uplink grant, data stored in a HARQ buffer. By removing the data stored in the HARQ buffer, the user device can avoid (322) transmitting, to the base station, the data stored in the HARQ buffer in response to a retransmission request from the base station.

20 Claims, 5 Drawing Sheets

(56) References Cited

U.S. PATENT DOCUMENTS

| | | | |
|---|---|---|---|
| 2015/0327295 A1* | 11/2015 | Yang | H04L 1/1854 |
| | | | 370/337 |
| 2018/0092051 A1* | 3/2018 | Dinan | H04W 52/365 |
| 2018/0102915 A1* | 4/2018 | Rico Alvarino | H04W 72/042 |
| 2018/0220440 A1* | 8/2018 | Dudda | H04L 1/1822 |
| 2018/0270026 A1* | 9/2018 | Lee | H04L 1/1887 |
| 2018/0310201 A1* | 10/2018 | Lee | H04L 1/1812 |
| 2018/0359775 A1* | 12/2018 | Yi | H04L 1/1822 |
| 2019/0068317 A1* | 2/2019 | Babaei | H04W 72/0446 |
| 2019/0068334 A1* | 2/2019 | Stern-Berkowitz | |
| | | | H04L 1/1845 |
| 2019/0158233 A1 | 5/2019 | Lee et al. | |
| 2019/0182855 A1 | 6/2019 | Babaei et al. | |
| 2019/0200382 A1* | 6/2019 | Dudda | H04L 1/1819 |
| 2019/0215907 A1 | 7/2019 | Phuyal et al. | |
| 2020/0128557 A1 | 4/2020 | Suzuki et al. | |

OTHER PUBLICATIONS

"SPS and DRX", 3GPP TSG-RAN WG2 #AH NR 1801; Vancouver, Canada, Jan. 22-26, 2018, Jan. 2018, 2 pages.

"Text Proposal on HARQ Procedure for Support of Arbitrary Starting Position of UL-GF Tx with K Repetitions", 3GPP TSG-RAN NR AH-1801; Vancouver, Canada, Jan. 22-26, 2018, Jan. 2018, 3 pages.

"UE Behavior on Configured Grant Timer Upon DCI Reception", 3GPP TSG-RAN WG2 NR AH-1801; Vancouver, Canada, Jan. 22-26, 2018, Jan. 2018, 6 pages.

"International Prliminary Report on Patentability", Application No. PCT/US2019/017506, dated Aug. 18, 2020, 8 pages.

\* cited by examiner

METHOD OF MANAGING HARQ BUFFER FOR NR

RELATED APPLICATION

This application claims priority under 35 U.S.C. § 119(e) to U.S. Provisional Patent Application 62/630,817, filed on Feb. 14, 2018, which is incorporated herein by reference in its entirety.

BACKGROUND

Hybrid automatic repeat requests (HARQs) are used by base stations of wireless networks to manage errors in communication with user devices. In advanced radio access technologies, such as a 5' generation new radio (5G-NR) technology, a user device (user equipment or UE) can receive an uplink (UL) grant from a downlink control information (DCI) message received over a physical downlink control channel (PDCCH). The DCI message may be addressed to a configured scheduling-radio network temporary identifier (CS-RNTI) that identifies a user device. The DCI may also request a retransmission of data based on the base station unsuccessfully receiving data during a previous uplink grant. If a HARQ buffer, corresponding to the previous uplink, is empty, the user device ignores the uplink grant.

However, if the user device ignores the uplink grant and fails to transmit during the uplink grant, the HARQ buffer may no longer be empty. In such a case, if the user device receives, from a base station, another uplink grant that requests adaptive retransmission, the user device transmits data that is stored in the HARQ buffer. This results in an unnecessary transmission of the data that is stored in the HARQ buffer, which may unnecessarily consume power of the user device used for transmitting the data. Additionally, the transmission may cause interference with other wireless communications operating near a same location, in a frequency-time domain, as the uplink grant.

SUMMARY

This document describes techniques for, and systems that enable, HARQ buffer management. These techniques include removing, based on a user device failing to transmit data during an uplink grant, data stored in a HARQ buffer. By removing the data stored in the HARQ buffer, the user device can avoid transmitting, to the base station, the data stored in the HARQ buffer in response to a retransmission request from the base station.

In some aspects, the user device receives, from a base station, a first configuration of configured scheduling. The first configuration includes a first radio network temporary identifier (RNTI). The user device receives, from the base station, a first uplink grant from a first downlink control information (DCI) message. The first DCI message is addressed to the first RNTI and indicates activation of the configured scheduling. Based on the first uplink grant being usable to transmit data in a first time interval, the user device determines a first HARQ process for the first time interval. The user device removes, based on the user device failing to transmit data during the first uplink grant, data stored in a buffer of the first HARQ process. The user device also receives, from the base station, a second uplink grant from a second DCI message. The second DCI message is also addressed to the first RNTI and includes a request for retransmission from the first HARQ process. Based on the data stored in the buffer of the first HARQ process being removed, the base station ignores the request for retransmission.

HARQ information for Downlink-Shared Channel (DL-SCH) or for Uplink-Shared Channel (UL-SCH) transmissions include a New Data Indicator (NDI), and a Transport Block (TB) size. For DL-SCH transmissions and for asynchronous UL HARQ and for autonomous UL HARQ, the HARQ information also includes a HARQ process ID, except for user equipments (UEs) in Narrow Band Internet of Things (NB-IoT) configured with a single HARQ process for which this information is not present. For UL-SCH transmission the HARQ information also includes a Redundancy Version (RV). In case of spatial multiplexing on DL-SCH the HARQ information includes a set of NDI and TB size for each transport block. HARQ information for Sidelink Shared Channel (SL-SCH) and Sidelink Discovery Channel (SL-DCH) transmissions consists of TB size only.

The term Msg3 refers to a message transmitted on an UL-SCH containing a cell-RNTI (C-RNTI) Media Access Control (MAC) Control Element (CE) or Common Control Channel (CCCH) Service Data Unit (SDU), submitted from an upper layer and associated with a user equipment (UE) Contention Resolution Identity, as part of a random access (RA) procedure.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of HARQ buffer management is described below. The use of the same reference numbers in different instances in the description and the figures may indicate like elements.

DETAILED DESCRIPTION

A user device generally ignores an uplink grant when it does not have data to send to a base station generating the uplink grant. However, when the user device ignores the uplink grant, by not sending data, the base station may determine that it unsuccessfully received data from the user device that was expected during the uplink grant. When the base station makes this determination, the base station may be configured to transmit, to the user device, another grant that includes a retransmission request. The retransmission request is based on a HARQ process and instructs the user device to retransmit data that was unsuccessfully received during the uplink grant. Although no data was transmitted during the uplink grant, data may be stored in a HARQ buffer of the HARQ process. The user device may transmit the data stored in the HARQ buffer to the base station.

This document describes techniques and systems for HARQ buffer management. These techniques include removing, or flushing, a HARQ buffer after an uplink grant during which data is not transmitted to the base station. For example, a user device establishes a wireless connection with a base station operating a cell of a wireless network. The user device receives, from the base station, an uplink grant to transmit data to the base station. However, the user device may be inactive and has no data to transmit to the base station during the uplink grant. Even though the user device does not transmit data during the uplink grant, data associated with the uplink grant may be stored on a HARQ buffer linked to the uplink grant. Based on not transmitting data during the uplink grant, the user device removes, or flushes, the data associated with the uplink grant from the HARQ buffer.

The base station attempts to receive data during the uplink grant, but, because no data was transmitted, the base station unsuccessfully receives data during the grant. The base station may follow a HARQ process that triggers transmission of another grant to the user device, which includes a request for retransmission of data that was expected during the uplink grant. The user device ignores the request based on the HARQ buffer being empty.

Figure 1:
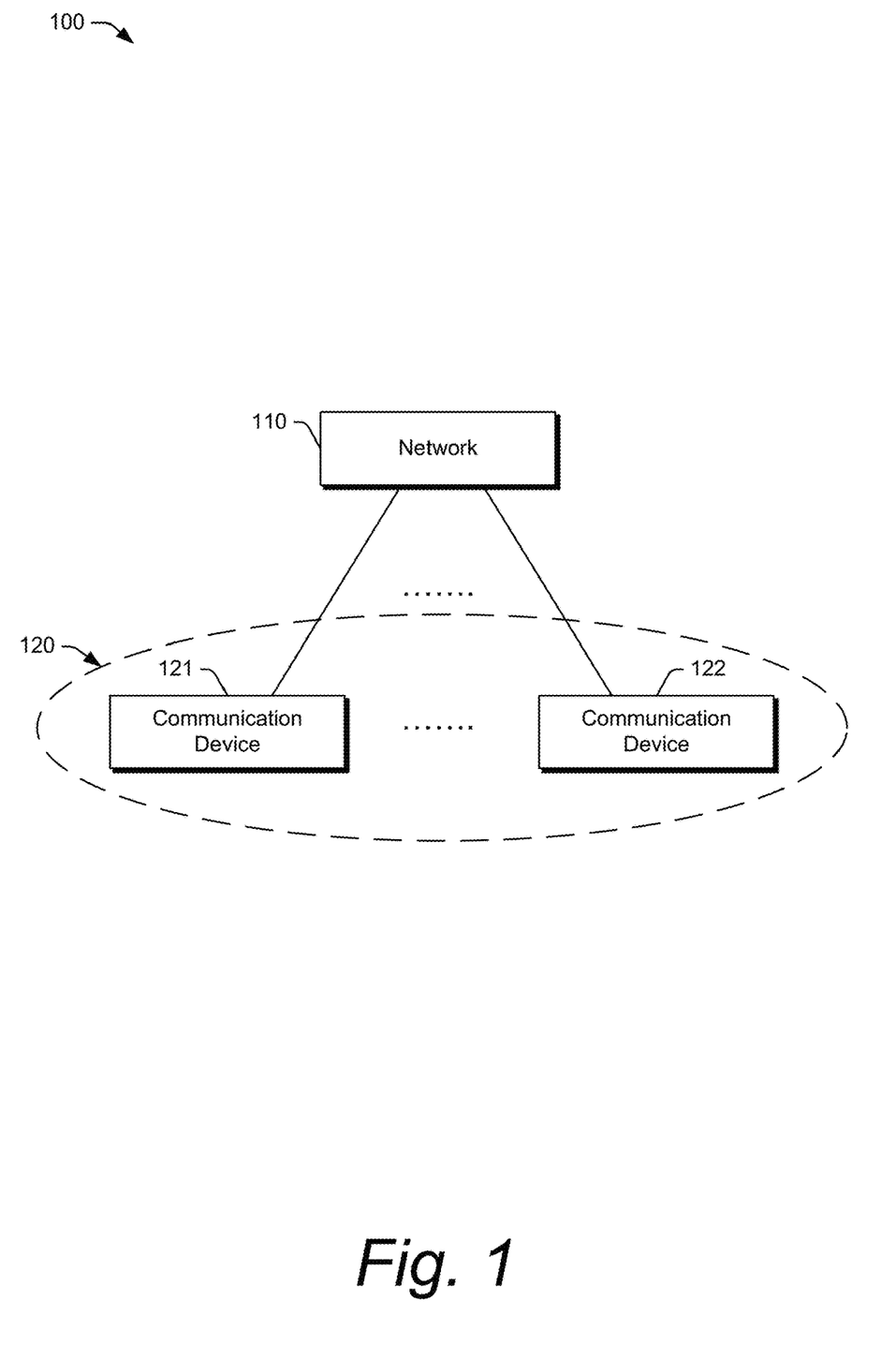
FIG. 1 is a schematic diagram of a wireless communication system according in accordance with one or more aspects of HARQ buffer management.

FIG. 1 is a schematic diagram of an example wireless communication system 100 usable for HARQ buffer management. The wireless communication system 100 comprises a network 110 and a plurality of communication devices 120 (e.g., communication device 121, communication device 122). The network 110 and one of the communication devices 120 communicate with each other via one or more cells on one or more carriers of licensed band(s) and/or unlicensed band(s). The one or more cells may be operated in the same or different frame structure types, or in the same or different duplexing modes, e.g., frequency-division duplexing (FDD) and time-division duplexing (TDD).

In FIG. 1, the network 110 and the communication devices 120 illustrate the structure of the wireless communication system 100. The network 110 may include a radio access network (RAN) including at least one base station (BS). The RAN may be an evolved universal terrestrial radio access network (E-UTRAN) including at least one evolved Node-B (eNB). The RAN may be a 5G NR network including at least one 5G BS (e.g., gNB), which employs orthogonal frequency-division multiplexing (OFDM) and/or non-OFDM to communicate with the communication devices. A transmission time interval (TTI) of the RAN may be shorter than 1 ms (e.g., 100 microseconds, 200 microseconds). In general, a BS may also be used to refer to any BS of the network 110, such as the eNB or the 5G BS. Furthermore, the network 110 may also include a core network which includes network entities connecting to the RAN.

The communication device 120 may be, for example, a user equipment, a machine type communication (MTC) device, a mobile phone, a laptop, a tablet computer, an electronic book, a portable computer system, a vehicle, or an aircraft. In addition, the network 110 and the communication device 120 can be seen as a transmitter or a receiver according to direction (e.g., transmission direction). For an uplink (UL) transmission, the communication device 120 is the transmitter and the network 110 is the receiver. For a downlink (DL) transmission, the network 110 is the transmitter and the communication device 120 is the receiver.

Figure 2:
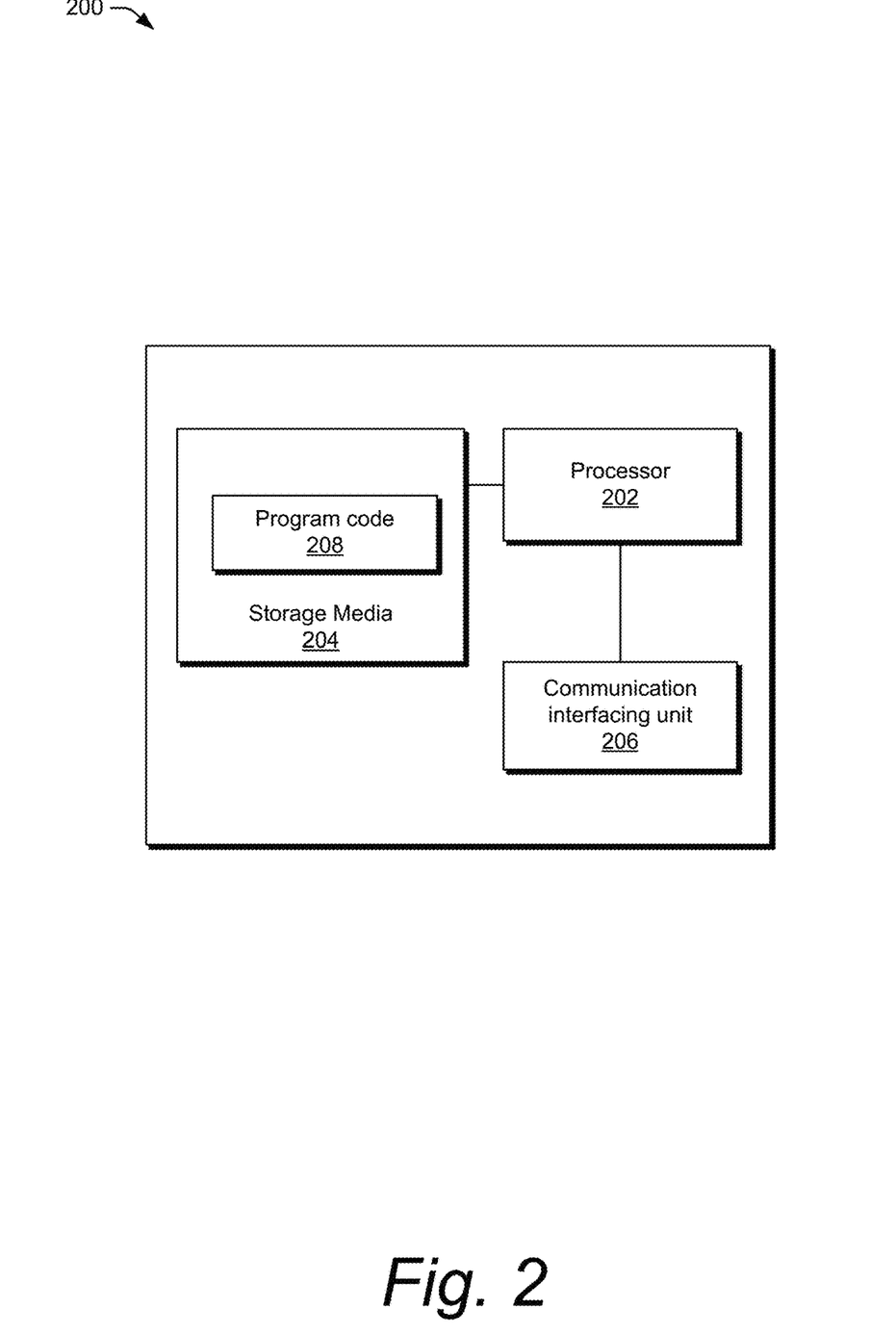
FIG. 2 is a schematic diagram of a communication device capable of implementing one or more aspects of HARQ buffer management.

FIG. 2 is a schematic diagram of a communication device 200 usable for HARQ buffer management. The communication device 200 may be a communication device 120 or the network 110 shown in FIG. 1, but is not limited herein. The communication device 200 may include a processor 202 such as a microprocessor or Application Specific Integrated Circuit (ASIC), storage media 204 and a communication module (e.g., communication interfacing unit 206). The storage media 204 may be any data storage device that may store a program code 208, accessed and executed by the processor 202. Examples of the storage device 204 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication module (e.g., communication interfacing unit 206) includes a transceiver, which may be hardware-based, and is used to transmit and receive signals (e.g., data, messages and/or packets) according to processing results of the processor 200.

Example Methods

For simplicity in the following implementations, a user device is used to represent a communication device 120 in FIG. 1. However, a process described below may be utilized by any communication device, as illustrated in FIG. 1. The process may be compiled into the program code 208 and executed by the processor 202.

Figure 3:
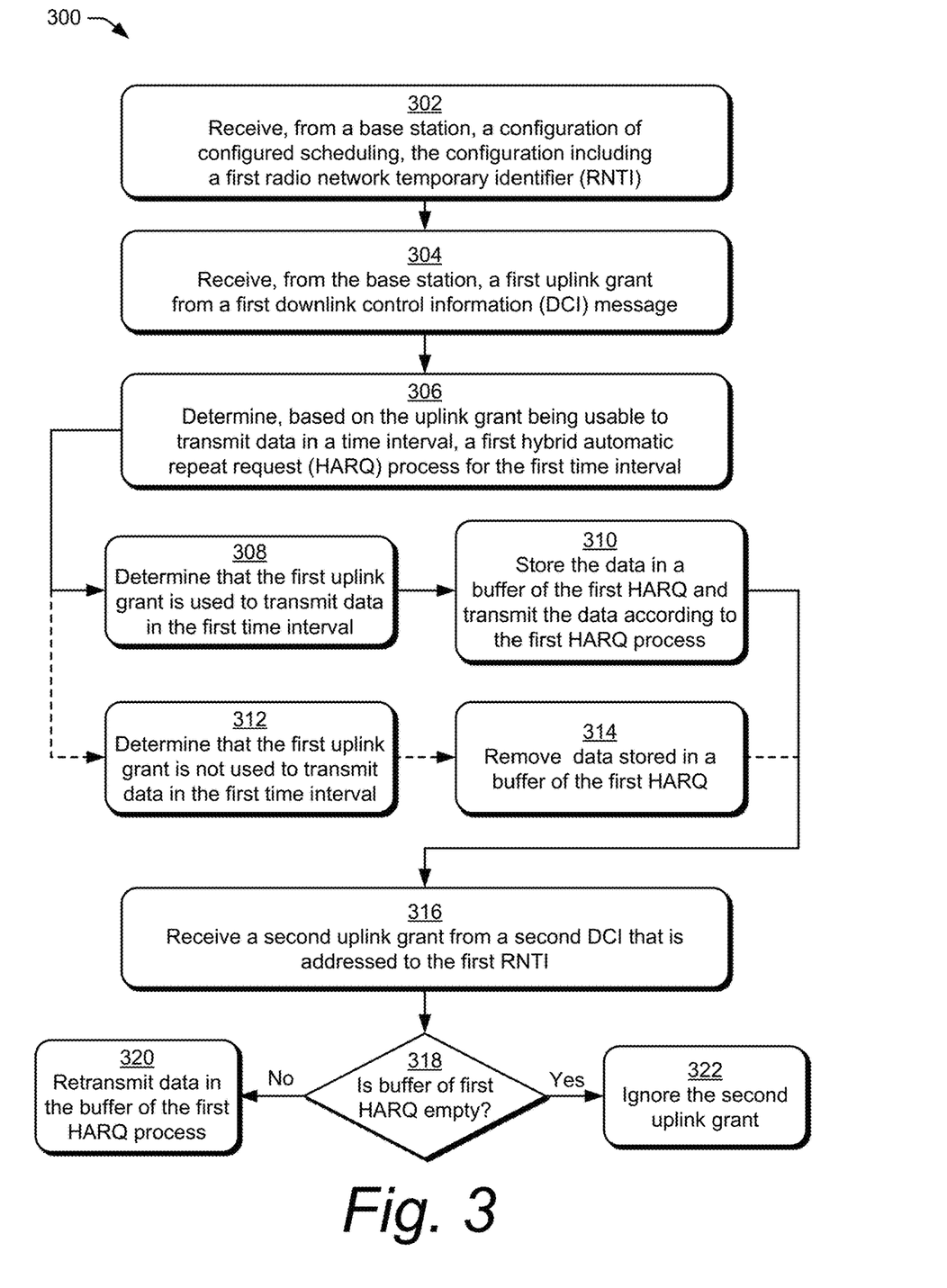
FIG. 3 depicts an example method for managing a HARQ buffer based on a retransmission request from a base station as part of a HARQ process.
Figure 4:
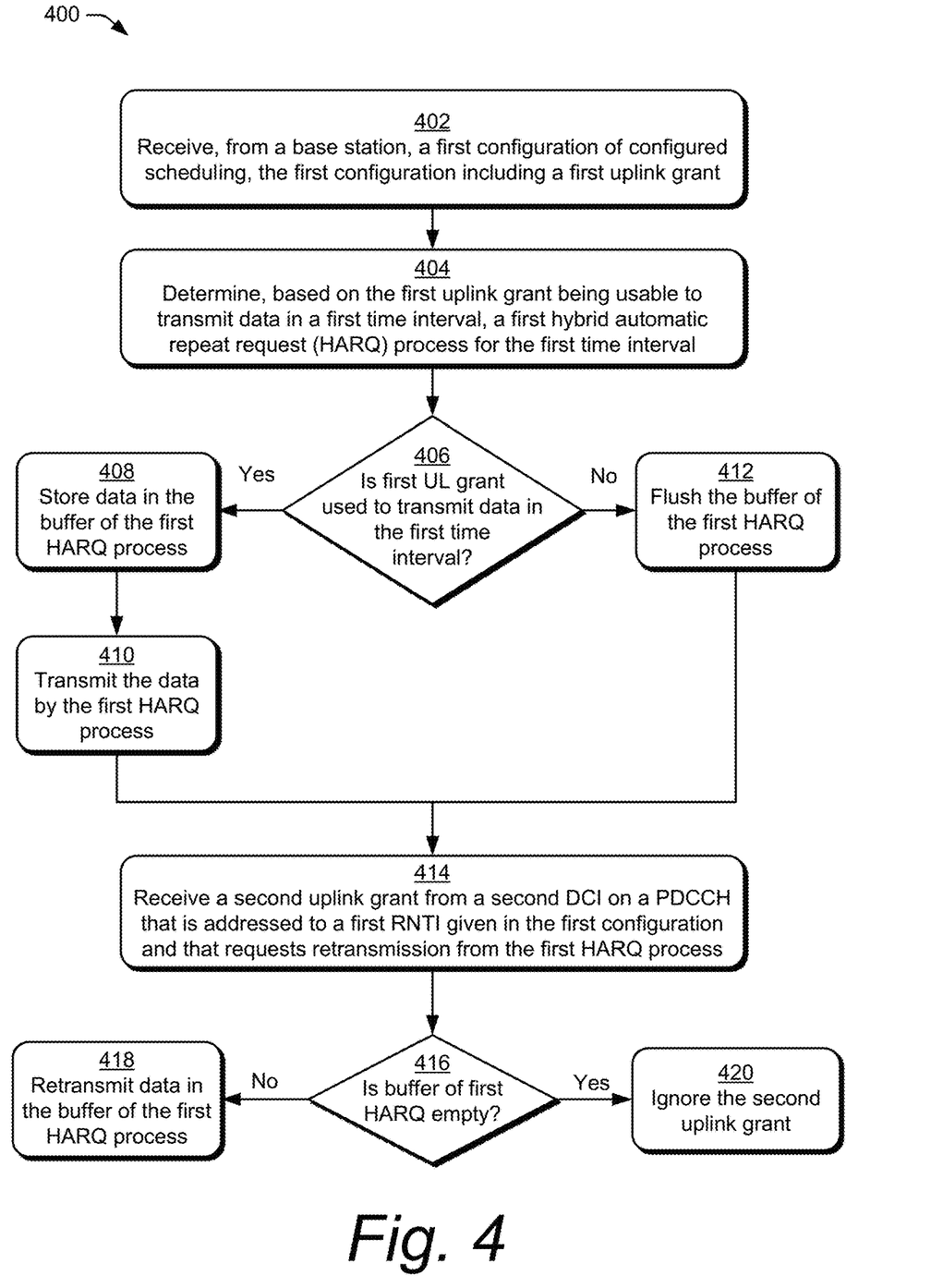
FIG. 4 depicts an example method for managing a HARQ buffer handling a retransmission request in a DCI received in a PDCCH.
Figure 5:
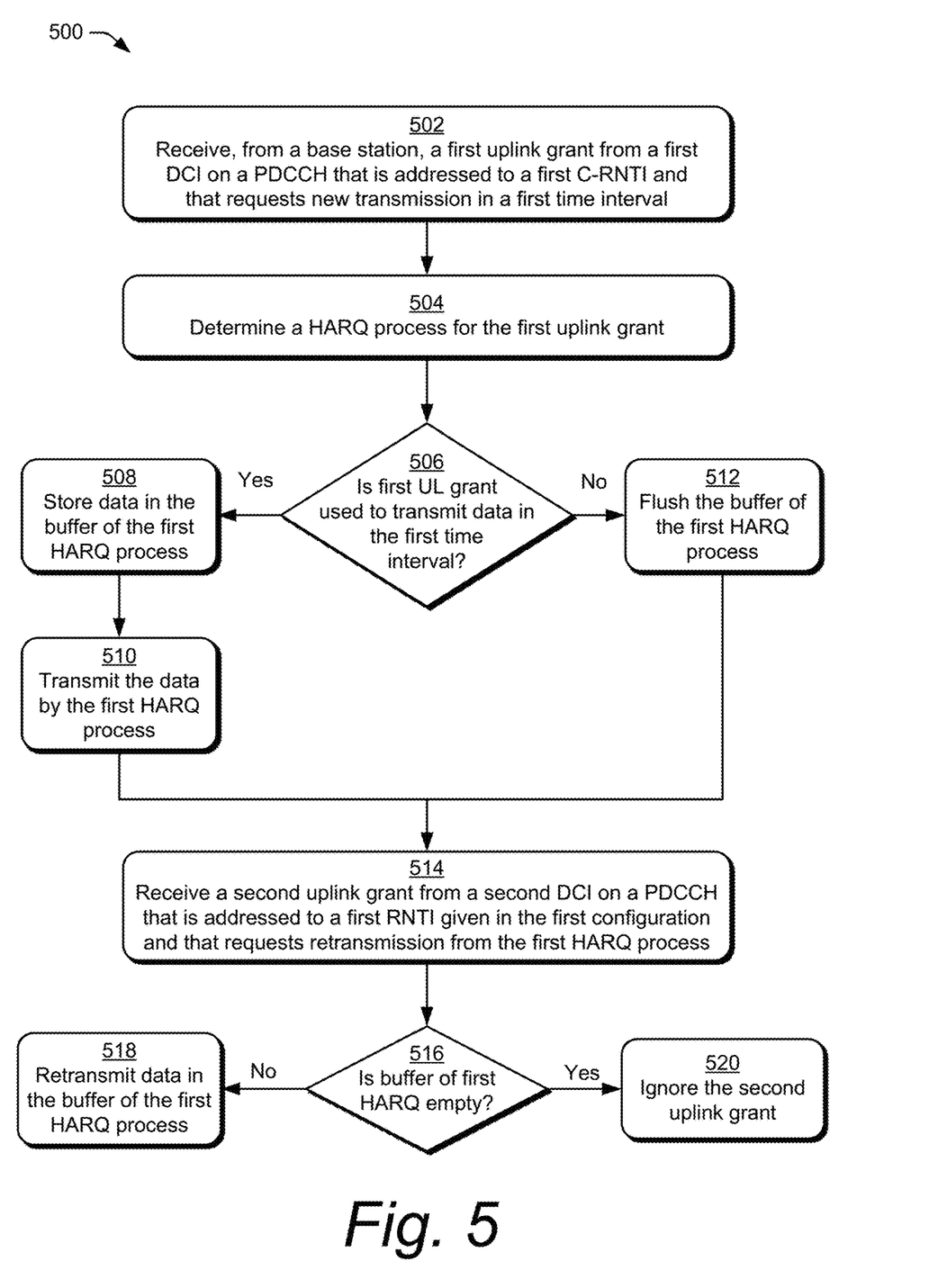
FIG. 5 depicts an example method for managing a HARQ buffer during dynamic scheduling.

Example methods 300, 400, and 500 are described with reference to FIGS. 3-5, respectively, in accordance with one or more aspects of managing a HARQ buffer for new radio. FIG. 3 depicts an example method 300 for managing a HARQ buffer based on a retransmission request from a base station as part of a HARQ process. FIG. 4 depicts an example method 400 for managing a HARQ buffer handling a retransmission request in a DCI received in a PDCCH. FIG. 5 depicts an example method 500 for managing a HARQ buffer during dynamic scheduling.

FIG. 3 depicts an example method 300 for managing a HARQ buffer based on a retransmission request from a base station as part of a HARQ process.

At 302, a user device receives a first configuration of configured scheduling. The first configuration includes a first RNTI.

At 304, the user device receives a first uplink grant from a first DCI. The DCI may be addressed to the first RNTI and indicates activation of the configured scheduling. Further, the DCI may be received over a PDCCH.

At 306, the user device determines a first HARQ process for a first time interval. The determining may be based on the first uplink grant being useable to transmit data in the first time interval.

At 308 the user device determines that the first uplink grant is used to transmit data in the first time interval. Then, at 310, the user device stores data associated with the first uplink grant in a buffer of the first HARQ process and transmits the data according to the first HARQ process. The implementation of 308-310 is optional.

Alternatively, at 312 the user device determines that the first uplink grant is not used to transmit data in the first time interval. At 314, the user device then removes any data stored in the buffer of the first HARQ process.

At 316, the user device receives a second uplink grant from a second DCI that is addressed to the first RNTI. The second uplink grant including a request for retransmission from the first HARQ process.

At 318, the user device then determines whether the buffer of the first HARQ is empty. In one instance, the user device determines that the buffer of the first HARQ is not empty ("NO"). Based on the buffer of the first HARQ storing data, the user device retransmits, at 320, the data in the buffer of the first HARQ process.

Alternatively, the user device determines that the buffer of the first HARQ is empty ("YES"). Based on the data stored in the buffer of the first HARQ being removed, the user device, at 322, ignores the second uplink grant.

FIG. 4 depicts an example method 400 for managing a HARQ buffer handling a retransmission request in a DCI received in a PDCCH.

At 402, a user device receives a first configuration of configured scheduling. The first configuration includes a first uplink grant.

If the first uplink grant, which is given in the first configuration, can be used to transmit data in a first time interval, the user device determines, at 404, a first HARQ process for the first time interval.

At 406, the user device determines whether the first uplink grant is being used to transmit data in the first time interval.

If using the first uplink grant to transmit data in the first time interval ("YES"), at 408 the user device stores data in the buffer of the first HARQ process and at 410 transmits the data by the first HARQ process.

If not using the first uplink grant to transmit data in the first time interval ("NO"), at 412 the user device flushes the buffer of the first HARQ process.

At 414, the user device receives a second uplink grant from a second DCI on a PDCCH that is addressed to a first RNTI, which is given in the first configuration, and that requests retransmission from the first HARQ process.

At 416, the user device determines whether the buffer of the first HARQ is empty.

If the buffer of the first HARQ is not empty ("NO"), then at 418 the user device retransmits data in the buffer of the first HARQ process.

If the buffer of the first HARQ is empty ("YES"), then at 420 the user device ignores the second uplink grant.

FIG. 5 depicts an example method 500 for managing a HARQ buffer during dynamic scheduling.

At 502, a user device receives a first uplink grant from a first DCI on a PDCCH that is addressed to a first C-RNTI and that requests new transmission in a first time interval.

At 504, the user device determines a first HARQ process for the first uplink grant.

At 506, the user device determines whether the first uplink grant is being used to transmit data in the first time interval.

If using the first uplink grant to transmit data in the first time interval, the user device, at 508, stores the data in the buffer of a first HARQ process and, at 510, transmits the data by the first HARQ process.

If not using the first uplink grant to transmit data in the first time interval, the user device, at 512, flushes the buffer of the first HARQ process.

At 514, the user device receives a second uplink grant from a second DCI on a PDCCH that is addressed to the first C-RNTI and that requests retransmission from the first HARQ process.

At 516, the user device determines whether the buffer of the first HARQ is empty.

If the buffer of the first HARQ is not empty ("NO"), the user device, at 518, retransmits data in the buffer of the first HARQ process.

If the buffer of the first HARQ is empty ("YES"), the user device, at 520, ignores the second uplink grant.

Example Implementations

Implementation 1 is similar to the example method 300, described above with respect to FIG. 3. When a user device receives a first configuration of configured scheduling from the gNB, the configuration may include a first RNTI and parameters that are used to determine in which time interval an uplink grant can be used to transmit data. The first RNTI can be a CS-RNTI. The user device can receive a first uplink grant from a first DCI on a PDCCH that is addressed to the first RNTI. If the first DCI indicates activation of configured scheduling, the user device can store the first uplink grant and determine in which time interval the first uplink grant can be used to transmit data. If the first uplink grant is usable to transmit data in the first time interval, the user device determines a first HARQ process for the first time interval. If the user device uses the first uplink grant to transmit data in the first time interval, the user device can store data in the buffer of the first HARQ process and then transmit the data by the first HARQ process. On the other hand, if the user device does not use the first uplink grant to transmit data in the first time interval, the user device may flush the buffer of the HARQ process. Afterward, if the user device receives a second uplink grant from a second DCI on a PDCCH that requests retransmission from the first HARQ process, the user device checks the buffer of the first HARQ process. If the buffer is not empty, the user device retransmits data in the buffer of the first HARQ process. Otherwise, the user device ignores the second uplink grant.

Implementation 2, which corresponds to the method 400 described with respect to FIG. 4, is similar to implementation 1. However, the first uplink grant in implementation 2 is given in the first configuration, rather than in a DCI received on a PDCCH.

Implementation 3, which corresponds to the method 500 described with respect to FIG. 5, is related to dynamic scheduling. When a user device receives a first uplink grant from a first DCI on a PDCCH that is addressed to a first C-RNTI and that requests a new transmission, if the user device does not use the first uplink grant to transmit data, the user device flushes the buffer of a first HARQ process. The first HARQ process is indicated in the first DCI. Afterward, if the user device receives a second uplink grant from the second DCI on a PDCCH that is addressed to the first C-RNTI and that requests a retransmission from the first HARQ process, the user device checks the buffer of the first HARQ process. If the buffer of the first HARQ process is empty, the user device ignores the second uplink grant. In other words, the user device does not use the second uplink grant to transmit data. However, if the buffer of the first HARQ process is not empty, the user device retransmits the data in the buffer of the first HARQ process.

In some implementations, the user device determines not to use the first uplink grant to transmit data in the first time interval if a media access control (MAC) protocol data unit (PDU) includes zero MAC service data units (SDUs).

The user device may determine not to use the first uplink grant to transmit data in the first time interval if a MAC PDU includes only a periodic buffer status report (BSR) and there is no data available for any logic channel group (LCG), or the MAC PDU includes only a padding BSR.

When the user device receives the second uplink grant, and if the buffer of the first HARQ is not empty but the transport block (TB) size allocated by the second uplink grant is too small to transmit the data in the buffer of the first HARQ process, the user device may ignore the second uplink grant.

When the user device receives the second uplink grant and if the buffer of the first HARQ is not empty but a transport block size allocated by the second uplink grant is too small to transmit the data in the buffer of the first HARQ, the user device may remove the buffer of the first HARQ process.

The first HARQ process may be assigned to the user device in the first configuration. Alternatively, the first HARQ process is pre-defined.

Example Implementation

For the purposes of the present document, the terms and definitions given in TR 21.905 [1] and the following apply. HARQ information for Downlink-Shared Channel (DL-SCH) or for Uplink-Shared Channel (UL-SCH) transmissions include a New Data Indicator (NDI), Transport Block (TB) size. For DL-SCH transmissions and for asynchronous UL HARQ and for autonomous UL HARQ, the HARQ information also includes HARQ process ID, except for user equipments (UEs) in Narrow Band Internet of Things (NB-IoT) configured with a single HARQ process for which this information is not present. For UL-SCH transmission the HARQ information also includes Redundancy Version (RV). In case of spatial multiplexing on DL-SCH the HARQ information includes a set of NDI and TB size for each transport block. HARQ information for Sidelink Shared Channel (SL-SCH) and Sidelink Discovery Channel (SL-DCH) transmissions consists of TB size only.

The term Msg3 refers to a message transmitted on an UL-SCH containing a cell-RNTI (C-RNTI) Media Access Control (MAC) Control Element (CE) or Common Control Channel (CCCH) Service Data Unit (SDU), submitted from an upper layer and associated with a user equipment (UE) Contention Resolution Identity, as part of a random access (RA) procedure.

The following may be used as a guideline for implementing one or more aspects of HARQ buffer management:

The MAC entity includes a HARQ entity for each Serving Cell with configured uplink (including the case when it is configured with supplementary Uplink), which maintains a number of parallel HARQ processes.

The number of parallel UL HARQ processes per HARQ entity is specified in TS 38.214 [7].

Each HARQ process supports one TB.

Each HARQ process is associated with a HARQ process identifier. For UL transmission with UL grant in RA Response, HARQ process identifier 0 is used.

When repetition is configured with repK>1, the parameter repK provides the number of repetitions of a TB within a bundle. Repetition operation relies on the HARQ entity for invoking the same HARQ process for each transmission that is part of the same bundle. Within a bundle HARQ retransmissions are non-adaptive and triggered without waiting for feedback from previous transmissions according to repK.

For each uplink grant, the HARQ entity shall:
1. identify the HARQ process associated with this grant, and for each identified HARQ process:
    2. if the received grant was not addressed to a Temporary C-RNTI on a PDCCH, and the NDI provided in the associated HARQ information has been toggled compared to the value in the previous transmission of this TB of this HARQ process; or
        3. if the uplink grant was received on a PDCCH for the C-RNTI and the HARQ buffer of the identified process is empty; or
    2. if the uplink grant was received in a Random Access Response:
        3. if there is a MAC PDU in the Msg3 buffer and the uplink grant was received in a Random Access Response:
            4. obtain the MAC PDU to transmit from the Msg3 buffer.
    3. else:
        4. obtain the MAC PDU to transmit from the "Multiplexing and assembly" entity, if any;
    3. if a MAC PDU to transmit has been obtained:
        4. deliver the MAC PDU and the uplink grant and the HARQ information of the TB to the identified HARQ process;
        4. instruct the identified HARQ process to trigger a new transmission;
        4. if the uplink grant is addressed to CS-RNTI; or
        4. if the uplink grant is a configured uplink grant; or
        4. if the uplink grant is addressed to C-RNTI, and the identified HARQ process is configured for a configured grant:
            5. start or restart the configuredGrantTimer, if configured, for the corresponding HARQ process when the transmission is performed.
    3. else:
        4. flush HARQ buffer of the identified process.
    2. else (i.e. retransmission):
        3. if the uplink grant received on a PDCCH was addressed to CS-RNTI and if the HARQ buffer of the identified process is empty:
            4. ignore the uplink grant.
        3. else:
            4. deliver the uplink grant and the HARQ information (redundancy version) of the TB to the identified HARQ process;
            4. instruct the identified HARQ process to trigger a retransmission;
            4. if the uplink grant is addressed to CS-RNTI; or
            4. if the uplink grant is addressed to C-RNTI, and the identified HARQ process is configured for a configured grant:
                5. start or restart the configuredGrantTimer, if configured, for the corresponding HARQ process when the transmission is performed.

When determining if NDI has been toggled compared to the value in the previous transmission the MAC entity shall ignore NDI received in all uplink grants on a PDCCH for its Temporary C-RNTI.

What is claimed is:
1. A method performed by a user device, the method comprising:
   receiving, from a base station, a configuration of configured scheduling including a configured uplink grant for new transmission of data in a time interval and a radio network temporary identifier (RNTI);
   determining a hybrid automatic repeat request (HARQ) process for the time interval;
   removing data stored in a buffer of the HARQ process based on the user device not using the configured uplink grant to transmit data in the time interval;

receiving, from the base station, downlink control information (DCI) addressed to the RNTI, the DCI including a request for retransmission from the HARQ process and a second uplink grant for the retransmission; and after removing the data stored in the buffer of the HARQ process, ignoring, the request for retransmission from the HARQ process.

2. The method described in claim 1, wherein the DCI that requests the retransmission comprises a second DCI, and the method further comprises:

receiving the configured uplink grant from a first DCI over a physical downlink control channel.

3. The method described in claim 2, further comprising: receiving an indication of activation of the configured scheduling in the first DCI.

4. The method described in claim 1, wherein ignoring the request for retransmission includes ignoring the second uplink grant if:

the buffer of the HARQ process is not empty; and
a transport block size allocated by the second uplink grant is too small to transmit the data in the buffer of the HARQ process.

5. The method described in claim 1, wherein removing data stored in the buffer of the HARQ process includes removing the buffer of the HARQ process if:

the buffer of the HARQ process is not empty; and
a transport block size allocated by the second uplink grant is too small to transmit the data in the buffer of the HARQ process.

6. The method described in claim 1, wherein the HARQ process is assigned to the user device in the configuration of configured scheduling.

7. The method described in claim 1, wherein the HARQ process is pre-defined.

8. The method described in claim 1, further comprising using parameters in the configuration to determine in which time interval the configured uplink grant is usable to transmit data.

9. The method described in claim 1, further comprising determining not to use the configured uplink grant to transmit the data in the time interval if a media access control protocol data unit (MAC PDU) includes zero MAC service data units (MAC SDUs).

10. The method described in claim 1, further comprising determining not to use the configured uplink grant to transmit the data in the time interval if a media access control protocol data unit (MAC PDU) includes only a periodic buffer status report (BSR) and no data is available for a logic channel group (LCG).

11. The method described in claim 1, further comprising determining not to use the configured uplink grant to transmit the data in the time interval if a media access control protocol data unit (MAC PDU) includes only a padding buffer status report.

12. The method described in claim 1, wherein receiving the configured uplink grant further comprises:

receiving an indication of the configured uplink grant in the configuration of configured scheduling.

13. A method performed by a user device, the method comprising:

receiving, from a base station, a configuration of configured scheduling, the configuration including a configured uplink grant;

determining, by using parameters in the configuration, a time interval of multiple time intervals that the user device can use for data transmission in the configured uplink grant;

determining a hybrid automatic repeat request (HARQ) process for a time interval;

removing data stored in a buffer of the HARQ process based on the user device not using the configured grant to transmit data during the time interval; and after removing the data stored in the buffer of the HARQ process, ignoring, responsive to removal of the data stored in the buffer of the HARQ process, a request for retransmission using a second uplink grant, the retransmission based on the HARQ process.

14. The method described in claim 13, wherein:

the configuration includes a radio network temporary identifier (RNTI);

the method further comprises receiving the second uplink grant from downlink control information (DCI) addressed to the RNTI in the configuration, the DCI including the request for retransmission; and ignoring the request for retransmission includes ignoring the second uplink grant.

15. The method described in claim 13, further comprising:

determining not to use the configured uplink grant to transmit the data in the time interval if a media access control protocol data unit (MAC PDU) includes:

zero MAC service data units (MAC SDUs);
a periodic buffer status report (BSR) and no data that is available for a logic channel group (LCG); or
only a padding BSR.

16. A method performed by a user device, the method comprising:

receiving, from a base station, a first uplink grant from first downlink control information (DCI), the first DCI addressed to a cell radio network temporary identifier (C-RNTI) and requesting a new transmission during a time interval;

determining a hybrid automatic repeat request (HARQ) process for the time interval;

flushing a buffer of the HARQ process based on the user device failing use the first uplink grant to transmit data during the time interval;

receiving a second uplink grant from second DCI on a physical downlink control channel, the second uplink grant addressed to the C-RNTI in the first DCI and including a request for retransmission; and ignoring, based on the buffer of the HARQ process being empty, the request for retransmission from the HARQ process by determining to not use the second uplink grant to transmit data.

17. The method described in claim 16, wherein the HARQ process is indicated in the first DCI.

18. The method described in claim 16, further comprising determining not to use the first uplink grant to transmit the data in the time interval if a media access control (MAC) protocol data unit includes:

zero MAC service data units;
a periodic buffer status report (BSR) and no data that is available for a logic channel group (LCG); or
only a padding BSR.

19. The method described in claim 16, wherein the HARQ process is assigned to the user device.

20. The method described in claim 16, wherein the HARQ process is pre-defined.

* * * * *

UNITED STATES PATENT AND TRADEMARK OFFICE
CERTIFICATE OF CORRECTION

PATENT NO. : 10,924,223 B2
APPLICATION NO. : 16/261006
DATED : February 16, 2021
INVENTOR(S) : Shiang-Rung Ye Page 1 of 1

It is certified that error appears in the above-identified patent and that said Letters Patent is hereby corrected as shown below:

In the Claims

Column 9, Line 7, after "process" before "the" delete "ignoring," insert --ignoring--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*